United States Patent
Yamashita (10) Patent No.: US 6,438,175 B1
(45) Date of Patent: Aug. 20, 2002

(54) DATA TRANSMISSION METHOD AND APPARATUS

(75) Inventor: Shigeyuki Yamashita, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/464,586

(22) Filed: Dec. 16, 1999

(30) Foreign Application Priority Data

Dec. 18, 1998 (JP) .......................................... 10-361237

(51) Int. Cl.⁷ .............................................. H04L 25/49
(52) U.S. Cl. ...................... 375/293; 375/359; 375/363; 375/366; 370/513; 370/514; 348/473; 348/513; 348/521; 341/95; 341/102
(58) Field of Search ................................. 375/292, 293, 375/354, 359, 363, 365, 366, 368; 370/503, 506, 509, 512, 513, 514, 528; 348/500, 513, 521, 525, 526, 473, 474; 341/60, 95, 102, 103

(56) References Cited

U.S. PATENT DOCUMENTS 4,486,739 A * 12/1984 Franaszek et al. ............ 341/59
5,592,160 A * 1/1997 Bennett et al. ................ 341/58
5,907,566 A * 5/1999 Benson et al. ............... 714/798
6,054,944 A * 4/2000 Yamashita .................... 341/58
6,225,924 B1 * 5/2001 Epshtein et al. ............ 341/106
6,323,789 B1 * 11/2001 Lawrence .................... 341/102

* cited by examiner

Primary Examiner—Stephen Chin
Assistant Examiner—Dac V. Ha
(74) Attorney, Agent, or Firm—Frommer Lawrence & Haug LLP; William S. Frommer (57) ABSTRACT

In transmitting ten-bit word string data including synchronous word data converted, at a transmitting side, from eight-bit word string data, representing signal information data synchronization required for reproducing the signal information is reliably established at a receiving side. An additional word data group containing eight-bit synchronous word data is inserted between words of the eight-bit word string data. Then, 8B–10B conversion is performed on the eight-bit word string data, thereby obtaining ten-bit word string data. In this case, the additional word data group is selected so that a running disparity of the ten-bit synchronous word data contained in the additional word data group of the composite ten-bit synchronous word data is consistently positive or negative.

22 Claims, 6 Drawing Sheets

|  | | CRD | − | + |
|---|---|---|---|---|
| DEA(8) | 011 10101 | D21.3 | 101010 1100 | 101010 0011 |
| DEB(8) | 100 10101 | D21.4 | 101010 1101 | 101010 0010 |
| DEC(8) | 101 10101 | D21.5 | 101010 1010 | 101010 1010 |

| CRD | − | + |
|---|---|---|
| DS(10) | 001111 1010 | 110000 0101 |

DATA TRANSMISSION METHOD AND APPARATUS

BACKGROUND OF THE INVENTION

1. Field of the Invention

The present invention relates to a data transmission method and apparatus for converting eight-bit word string data representing signal information, such as video signal information, converted from ten-bit word string data, into ten-bit word string data including synchronous word data, and for transmitting the converted data to a transmission channel.

2. Description of the Related Art

As one of the means for transmitting digital data indicating various signal information, such as video signal information, an optical transmission system is proposed in which digital data is converted into a light signal, and is transmitted through a transmission channel, which is formed of optical fiber. Digital data handled in this type of optical transmission system is converted into serial data having a bit rate of, for example, a few hundreds of Mbps to one Gbps.

Digital data handled in one of the optical transmission systems, e.g., in a fiber channel system, is converted in the following manner. At the transmitting side, eight-bit word string data (eight bits forms one word) is converted into ten-bit word string data (ten bits forms one word), i.e., 8B–10B conversion is performed. Further, parallel-to-serial conversion is performed on the resulting ten-bit word string data, thereby obtaining serial data. At the receiving side, serial-to-parallel conversion is performed on the received serial data. Then, the ten-bit word string data is converted into the original eight-bit word string data, i.e., 10B–8B conversion is conducted.

Figure 6:
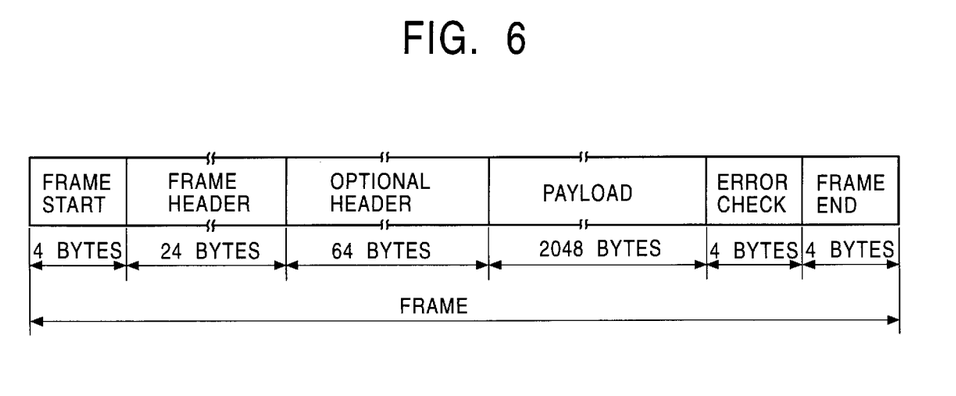
FIG. 6 illustrates the concept of a "frame" used in transmitting digital data.

The digital data to be transmitted as the ten-bit word string data through the transmission channel, which is formed of an optical fiber, in the fiber channel system is compliant with the data format such as the one shown in FIG. 6. In this data format, a packet is formed as the smallest unit, which is referred to as a "frame". The entire frame shown in FIG. 6 has 2148 bytes, and is formed of a 4-byte frame start field, a 24-byte frame header field, a 64-byte optional header field, a 2048-byte payload field, a 4-byte error check field, and a 4-byte frame end field. Among these frame fields, the 2048-byte payload field stores ten-bit word string data representing signal information. More specifically, at the transmitting side, a plurality of frames, each storing the ten-bit word data having a maximum amount of 2048 bytes in the payload field, are formed, and are sequentially transmitted. Upon receiving the frames, the receiving side extracts the ten-bit word string data from the payload fields of the individual frames.

In the above-described ten-bit word string data, the number of ones may be greater than the number of zeros, or the number of zeros may be greater than the number of ones, or the number of ones and the number of zeros may be equal. This can be represented by the concept of "running disparity (RD)". When the number of ones is greater than the number of zeros, RD is positive. When the number of zeros is larger than the number of ones, RD is negative. When the number of ones and the number of zeros are equal, RD is neutral. The word data having a greater number of ones than zeros is referred to as the "word data having a positive RD". The word data having a greater number of zeros than ones is referred to as the "word data having a negative RD". The word data having the same number of ones and zeros is referred to as the "word data having a neutral RD (neutral word data)".

In conducting 10B–8B conversion on the received ten-bit word string data, it is necessary for the receiving side to correctly identify the individual ten-bit word string data. Accordingly, at the transmitting side, synchronous word data is suitably inserted in the ten-bit word string data to be transmitted as serial data. Although the synchronous word data is also ten-bit word data, it has a specific code, which is not used for the regular ten-bit word data indicating information to be transmitted. If the RD of the word data positioned immediately before the synchronous word data to be inserted is negative, the RD of the synchronous word data is determined to be positive. Conversely, if the RD of the word data immediately before the synchronous word data to be inserted is positive, the RD of the synchronous word data is determined to be negative.

Figure 7:
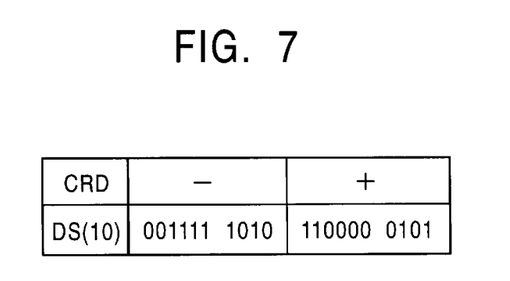
FIG. 7 illustrates the concept of synchronous word data used in transmitting digital data.

The synchronous word data may be ten-bit word data DS(10), whose code name is referred to as "K28.5". FIG. 7 illustrates such ten-bit word data DS(10). When the CRD, which is the RD of the previous word data, is negative (−), the word data DS(10) results in "001111 1010" having a positive RD. In contrast, when the CRD, which is the RD of the previous word data, is positive, the word data DS(10) results in "110000 0101" having a negative RD (hereinafter "001111 1010" is referred to as "+K28.5", while "110000 0101" is referred to as "K28.5").

It is now assumed that the ten-bit word string data to be transmitted designates video signal information. To enhance the transmission efficiency, it is desired that the greatest possible number of ten-bit word string data be stored in the payload field of each frame. Thus, at the transmitting side, ten-bit word string data corresponding to many horizontal periods of the video signal are stored in the payload field of each frame. Meanwhile, to establish horizontal synchronization in performing data processing by the receiving side, it is desired that synchronous word data be inserted in the ten-bit word string data corresponding to every horizontal period of the video signal.

To fulfil the above-mentioned function of the synchronous data, it is now assumed that the synchronous data is inserted as +K28.5 or −K28.5 according to whether the RD of the previous word data is negative or positive, as stated above.

As discussed above, at the transmitting side of, for example, the fiber channel system, many frames are formed in which ten-bit word string data, added with the word data DS(10) as the synchronous word data, are stored in the payload fields. The frames are then sequentially transmitted. Upon receiving the frames, the receiving side extracts the ten-bit word string data from the payload field of each frame and detects the synchronous word data, generally, as follows, before processing the ten-bit word string data. Only the word data DS(10) having a positive RD, i.e., +K28.5, is detected as the synchronous data. Alternatively, only the word data DS(10) having a negative RD, i.e., −K28.5, is detected as the synchronous data. This is because a predetermined restriction is imposed on the addition of the synchronous word data to the ten-bit word string data. Due to this restriction, it is sufficient for the receiving side to detect only +K28.5 or −K28.5 of the synchronous word data.

However, if only the word data DS(10) having a positive RD, i.e., +K28.5, or only the word data DS(10) having a negative RD, i.e., −K28.5, is detected, the following problem is caused when the receiving side performs data processing under the following situation. That is, to fulfil the function of the synchronous word data, as stated above, the word data DS(10) having a positive RD, i.e., +K28.5, or the word data DS(10) having a negative RD, i.e., −K28.5, is inserted in the ten-bit word string data corresponding to every horizontal period of the video signal according to whether the RD of the previous word data is negative or positive.

More specifically, if only +K28.5 or −K28.5 is detected as synchronous data at the receiving side, the synchronous word data cannot be detected for the ten-bit word string data corresponding to every horizontal period of the video signal in processing the ten-bit word string data. As a result, in reproducing the video signal information represented by the ten-bit word string data, correct horizontal synchronization may not be reliably established.

Consequently, in transmitting digital data representing various signal information, such as video signal information, accompanied by the 8B–10B conversion and the addition of the synchronous word data at the transmitting side, and the detection of the synchronous word data and the 10B–8B conversion at the receiving side, the use of integrated circuit (IC) devices for processing digital data in, for example, the fiber channel system, becomes difficult. By using the above types of IC devices, the word data DS(10) having a positive RD, i.e., +K28.5, or the word data DS(10) having a negative RD, i.e., −K28.5, is inserted as the synchronous word data in the ten-bit word string data corresponding to every horizontal period of a signal according to whether the RD of the previous word data is negative or positive. Thus, the above-described problems occur in detecting the synchronous word data from the ten-bit word string data at the receiving side.

SUMMARY OF THE INVENTION

Accordingly, in view of the above background, it is an object of the present invention to provide a data transmission method and apparatus in which, after transmitting ten-bit word string data including synchronous word data, converted from eight-bit word string data representing signal information, such as video signal information, data synchronization, which is required for reproducing the signal information, such as converting the ten-bit word string data into the eight-bit word string data, is reliably established at the receiving side even if only the synchronous word data having a positive RD or only the synchronous word data having a negative RD is detected at the receiving side.

In order to achieve the above object, according to one aspect of the present invention, there is provided a data transmission method including: a receiving step of receiving eight-bit word string data indicating signal information; an insertion step of inserting an additional word data group including specific synchronous word data and at least one item of auxiliary word data, each data having eight bits and a predetermined code, between words of the eight-bit word string data in accordance with a predetermined timing signal; a conversion step of converting the eight-bit word string data provided with the additional word data group into ten-bit word string data; a forming step of forming composite ten-bit word string data including the additional word data group containing ten-bit synchronous word data which is converted from the specific synchronous word data; and a transmission step of transmitting the composite ten-bit word string data. In the above-described insertion step, the additional word data group is selected so that the RD of the ten-bit synchronous word data contained in the additional word data group of the composite ten-bit synchronous word data is consistently positive or negative.

According to another aspect of the present invention, there is provided a data transmission apparatus including a digital data forming unit for forming eight-bit word string data indicating signal information. A ten-bit word string data forming unit inserts an additional word data group including specific synchronous word data and at least one item of auxiliary word data, each data having eight bits and a predetermined code, between words of the eight-bit word string data in accordance with a predetermined timing signal, and converts the eight-bit word string data provided with the additional word data group into ten-bit word string data, thereby forming composite ten-bit word string data including the additional word data group containing ten-bit synchronous word data which is converted from the specific synchronous word data. A data transmitting unit transmits the composite ten-bit word string data. The ten-bit word string data forming unit inserts the additional word data group between the words of the eight-bit word string data so that the RD of the ten-bit synchronous word data contained in the additional word data group of the composite ten-bit synchronous word data is consistently positive or negative.

According to the aforementioned data transmission method and data transmission apparatus, as discussed above, the composite ten-bit word string data to be transmitted includes ten-bit synchronous word data constantly having a positive or negative RD. Such ten-bit synchronous word data is set to be the word data DS(10) having a positive RD, i.e., +K28.5, or the word data DS(10) having a negative RD, i.e., −K28.5. It is determined whether the ten-bit synchronous word data contained in the composite ten-bit word string data constantly exhibits positive or negative according to which RD, i.e., positive or negative, of the synchronous word data the receiving side detects.

The composite ten-bit word string data transmitted as described above can be correctly and suitably detected as synchronous word data required for converting from the ten-bit word string data into the eight-bit word string data by the receiving side. It is thus possible to reliably establish data synchronization required for reproducing signal information represented by the received composite ten-bit word string data by the receiving side.

According to the aforementioned data transmission method and data transmission apparatus, integrated circuit (IC) devices provided for digital data processing in, for example, a fiber channel system, can be effectively utilized.

The additional word data group contained in the composite ten-bit word string data may be formed of four, three, or two word data.

It is now assumed that the additional word data group contained in the composite ten-bit word string data has four word data. When the RD of ten-bit word data positioned immediately before the additional word data group is positive, the additional word data group of the composite ten-bit word string data may include ten-bit word data having a negative RD, ten-bit word data having a neutral RD, ten-bit synchronous word data having a positive RD, and another ten-bit word data, or may include the ten-bit word data having a negative RD, the ten-bit synchronous word data having a positive RD, and another ten-bit word data. Conversely, when the RD of ten-bit word data positioned immediately before the additional word data group is negative, the additional word data group of the composite ten-bit word string data may include ten-bit word data having a neutral RD, another ten-bit word data having a neutral RD, the ten-bit synchronous word data having a positive RD, and another ten-bit word data, or may include the ten-bit word data having a neutral RD, the ten-bit synchronous word data having a positive RD, and another ten-bit word data.

Alternatively, when the RD of ten-bit word data positioned immediately before the additional word data group is negative, the additional word data group of the composite ten-bit word string data may include ten-bit word data having a positive RD, ten-bit word data having a neutral RD, ten-bit synchronous word data having a negative RD, and another ten-bit word data, or may include the ten-bit word data having a positive RD, the ten-bit synchronous word data having a negative RD, and another ten-bit word data. Conversely, when the RD of ten-bit word data positioned immediately before the additional word data group is positive, the additional word data group of the composite ten-bit word string data may include ten-bit word data having a neutral RD, another ten-bit word data having a neutral RD, the ten-bit synchronous word data having a negative RD, and another ten-bit word data, or may include the ten-bit word data having a neutral RD, the ten-bit synchronous word data having a negative RD, and another ten-bit word data.

It is now assumed that the additional word data group contained in the composite ten-bit word string data is formed of three word data. When the RD of ten-bit word data positioned immediately before the additional word data group is positive, the additional word data group of the composite ten-bit word string data may include ten-bit word data having a negative RD, ten-bit word data having a neutral RD, and ten-bit synchronous word data having a positive RD, or may include the ten-bit word data having a negative RD and the ten-bit synchronous word data having a positive RD. Conversely, when the RD of ten-bit word data positioned immediately before the additional word data group is negative, the additional word data group of the composite ten-bit word string data may include ten-bit word data having a neutral RD, another ten-bit word data having a neutral RD, and the ten-bit synchronous word data having a positive RD, or may include the ten-bit word data having a neutral RD and the ten-bit synchronous word data having a positive RD.

Alternatively, when the RD of ten-bit word data positioned immediately before the additional word data group is negative, the additional word data group of the composite ten-bit word string data may include ten-bit word data having a positive RD, ten-bit word data having a neutral RD, and ten-bit synchronous word data having a negative RD, or may include the ten-bit word data having a positive RD and the ten-bit synchronous word data having a negative RD. Conversely, when the RD of ten-bit word data positioned immediately before the additional word data group is positive, the additional word data group of the composite ten-bit word string data may include ten-bit word data having a neutral RD, another ten-bit word data having a neutral RD, and the ten-bit synchronous word data having a negative RD, or may include the ten-bit word data having a neutral RD and the ten-bit synchronous word data having a negative RD.

It is now assumed that the additional word data group contained in the composite ten-bit word string data is formed of two word data. When the RD of ten-bit word data positioned immediately before the additional word data group is positive, the additional word data group of the composite ten-bit word string data may include ten-bit word data having a negative RD and ten-bit synchronous word data having a positive RD. Conversely, when the RD of ten-bit word data positioned immediately before the additional word data group is negative, the additional word data group of the composite ten-bit word string data may include ten-bit word data having a neutral RD and the ten-bit synchronous word data having a positive RD.

Alternatively, when the RD of ten-bit word data positioned immediately before the additional word data group is negative, the additional word data group of the composite ten-bit word string data may include ten-bit word data having a positive RD and ten-bit synchronous word data having a negative RD. Conversely, when the RD of ten-bit word data positioned immediately before the additional word data group is positive, the additional word data group of the composite ten-bit word string data may include ten-bit word data having a neutral RD and the ten-bit synchronous word data having a negative RD.

DESCRIPTION OF THE PREFERRED EMBODIMENTS

The present invention is described below in detail through illustration of a preferred embodiment.

Figure 1:
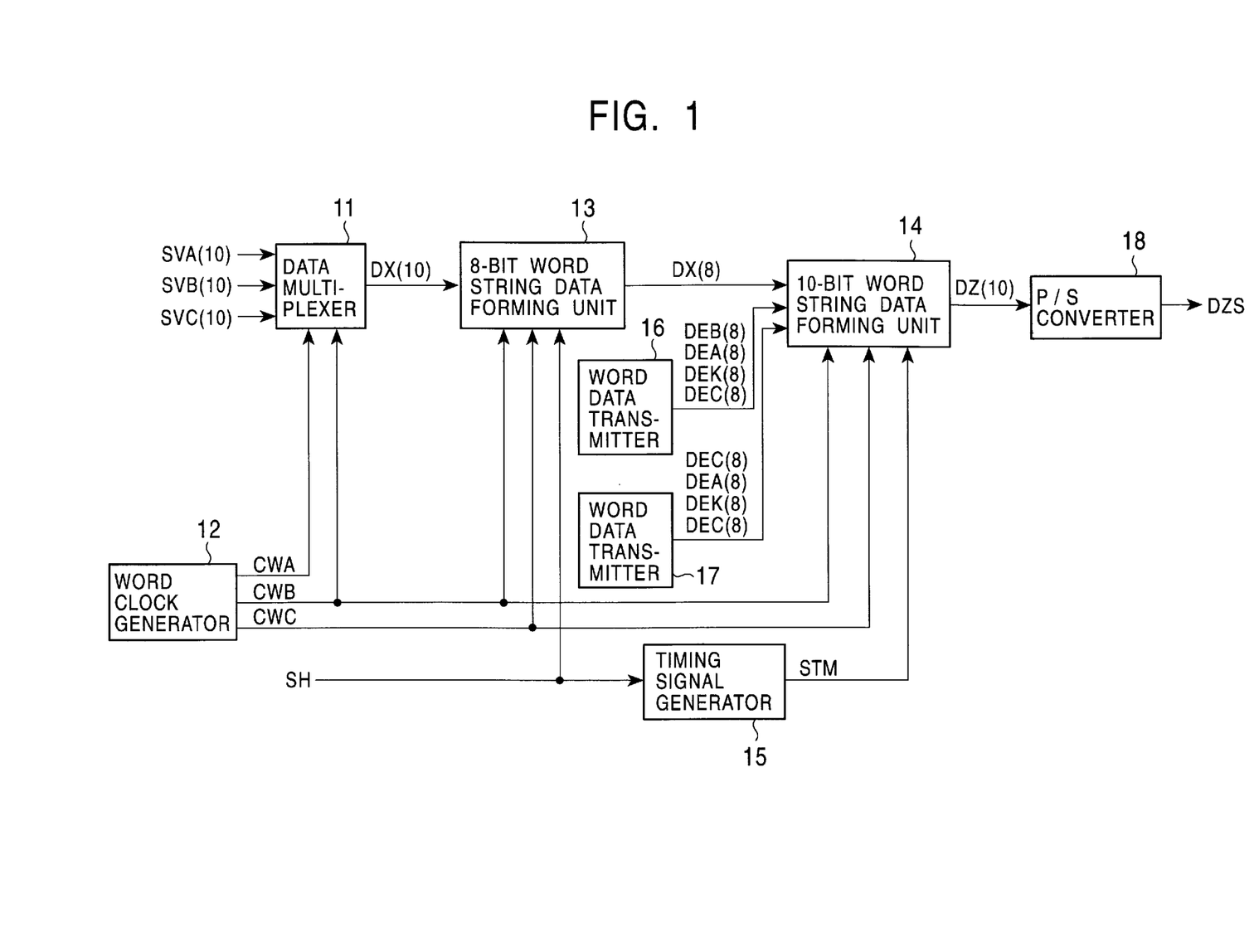
FIG. 1 is a block diagram illustrating a data transmission apparatus which employs a data transmission method according to an embodiment of the present invention.

Referring to the block diagram of a data transmission apparatus according to an embodiment of the present invention shown in FIG. 1, ten-bit word string data SVA(10), SVB(10), and SVC(10), representing three types of video signal information, are supplied to a data multiplexer 11. Word clock signals CWA and CWB are supplied from a word clock generator 12 to the data multiplexer 11. The ten-bit word string data SVA(10), SVB(10), and SVC(10) are multiplexed in the data multiplexer 11 based on the word clock signals CWA and CWB while synchronizing the horizontal periods of the individual data with each other, thereby forming multiplexed ten-bit word string data DX(10). The multiplexed ten-bit word string data DX(10) is configured, as indicated by A of FIG. 2, such that the individual horizontal periods are formed of corresponding ten-bit word data (A0 through A9), (A10 through A19), (A20 through A29), and so on, and corresponding ten-bit word data (B0 through B9), (B10 through B19), (B20 through B29), and so on. In each horizontal period of the multiplexed data DX(10), the horizontal periods of the corresponding three types of video signal information SVA (10), SVB(10), and SVC(10) are multiplexed and stored.

The multiplexed ten-bit word string data DX(10) is supplied from the data multiplexer 11 to an eight-bit word string data forming unit 13. Supplied to the eight-bit word string data forming unit 13 are not only word clock signals CWB and CWC transmitted from the word clock generator 12, but also a common horizontal synchronous signal SH, which is used for all the video signal information SVA(10), SVB(10), and SVC(10). In the eight-bit word string data forming unit 13, 10B–8B conversion is performed on the multiplexed ten-bit word string data DX(10), based on the word clock signals CWB and CWC, by using the leading edge of the horizontal synchronous signal SH as a reference point, as indicated by B of FIG. 2, thereby forming multiplexed eight-bit word string data DX(8) converted from the multiplexed ten-bit word string data DX(10).

Figure 2:
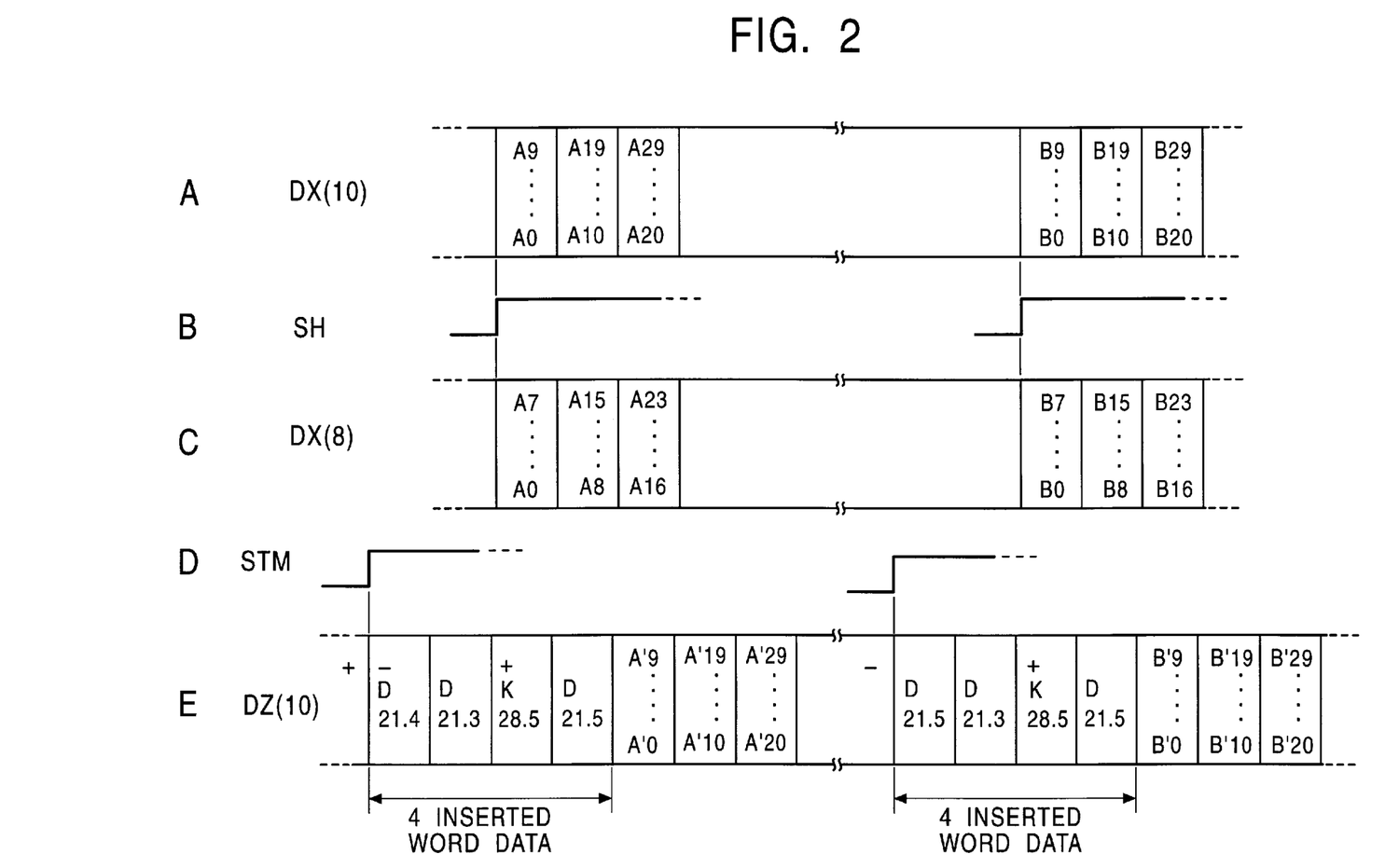
FIG. 2 is a timing chart illustrating an operation performed by the data transmission apparatus shown in FIG. 1.

The multiplexed eight-bit word string data DX(8) is configured, as shown by C of FIG. 2, such that the individual horizontal periods are formed of corresponding eight-bit word data (A0 through A7), (A8 through A15), (A16 through A23), and so on, and corresponding eight-bit word data (B0 through B7), (B8 through B15), (B16 through B23), and so on. In each horizontal period of the multiplexed data DX(8), the horizontal periods of the corresponding three types of video signal information SVA(10), SVB(10), and SVC(10) are multiplexed and stored.

The multiplexed eight-bit word string data DX(8) is supplied from the eight-bit word string data forming unit 13 to a ten-bit word string data forming unit 14. Not only the word clock signals CWB and CWC transmitted from the word clock generator 12, but also, a timing signal STM based on the horizontal synchronous signal SH transmitted from a timing generator 15, are supplied to the ten-bit word string data forming unit 14. Also supplied to the ten-bit word string data forming unit 14 are a first additional word data group including four eight-bit word data, such as auxiliary word data DEB(8), auxiliary word data DEA(8), synchronous word data DEK(8), and auxiliary word data DEC(8), from a word data transmitter 16 and a second additional word data group including four eight-bit word data, such as auxiliary word data DEC(8), auxiliary word data DEA(8), synchronous word data DEK(8), and auxiliary word data DEC(8), from a word data transmitter 17.

In the ten-bit word string data forming unit 14, the first additional word data group transmitted from the word data transmitter 16 or the second additional word data group from the word data transmitter 17 is inserted between words of the multiplexed eight-bit word string data DX(8) according to the timing signal STM. Then, 8B–10B conversion is conducted, based on the word clock signal CWC and CWB, on the multiplexed eight-bit word string data DX(8) provided with the first additional word data group or the second additional word data group. As a result, composite ten-bit word string data DZ(10) based on the eight-bit word string data DX(8) provided with the first additional word data group or the second additional word data group is formed.

With this arrangement, the synchronous word data DEK (8), which is originally eight-bit word data, becomes the above-described word data DZ(10) when being converted into ten-bit word data. Accordingly, the synchronous word data DEK(8) is referred to by a code name, i.e., K28.5, when being converted into ten-bit word data. If the CRD, which is the RD of the word data positioned immediately before the synchronous word data DS(10), is negative (−), the synchronous word data DEK(8) becomes +K28.5. Conversely, if the CRD of the previous word data is positive (+), the synchronous word data DEK(8) becomes −K28.5.

Figure 3:
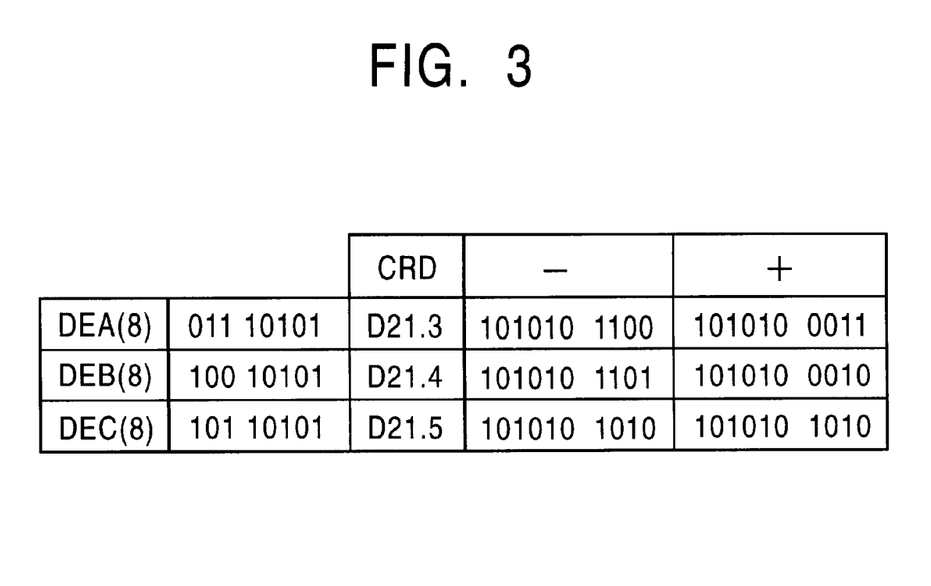
FIG. 3 illustrates the concept of auxiliary word data used in the data transmission apparatus shown in FIG. 1.

The auxiliary word data DEA(8), DEB(8), and DEC(8) are eight-bit word data, as shown in FIG. 3, indicated by "011 10101", "100 10101", and "101 10101", respectively. When being converted into ten-bit word data, the auxiliary word data DEA(8), DEB(8), and DEC(8) are referred to by code names, such as D21.3, D21.4, and D21.5, respectively. If the CRD of the previous word data is negative (−), the RD of D21.3 is set to be neutral, i.e., "101010 1100". If the CRD of the previous word data is positive (+), the RD of D21.3 is set to be neutral, i.e., "101010 0011". Concerning D21.4, if the CRD of the previous word data is negative (−), the RD of D21.4 is set to be positive, i.e., "101010 1101" (hereinafter referred to as "+D21.4"). If the CRD of the previous word data is positive (+), the RD of D21.4 is set to be negative, i.e., "101010 0010" (hereinafter referred to as "−D21.4"). The RD of D21.5 is always neutral "101010 1010" regardless of whether the CRD of the previous word data is negative or positive.

In the ten-bit word string data forming unit 14, the first additional word data group or the second additional word data group is inserted between words of the multiplexed eight-bit word string data DX(8) according to the timing signal STM in the following manner. The leading edge of the multiplexed eight-bit word string data DX(8) (indicated by C of FIG. 2) which is shifted backward by four word data from each of the eight-bit word data (A0 through A7), (B0 through B7), and so on, corresponding to the leading edge of the horizontal synchronous signal SH (represented by B of FIG. 2), is first specified according to the timing signal STM. Then, the four eight-bit word data positioned from the leading edge of the timing signal STM to the leading edge of the horizontal synchronous signal SH are substituted with the first additional word data group consisting of the auxiliary word data DEB(8), the auxiliary word data DEA(8), the synchronous word data DEK(8), and the auxiliary word data DEC(8), or the second additional word data group consisting of the auxiliary word data DEC(8), the auxiliary word data DEA(8), the synchronous word data DEK(8), and the auxiliary word data DEC(8).

More specifically, if the RD of the eight-bit word data of the multiplexed eight-bit word string data DX(8) immediately before the leading edge of the timing signal STM, that is, the eight-bit word data which is shifted backward by five word data from the leading edge of each of the eight-bit word data (A0 through A7), (B0 through B7), and so on, corresponding to the leading edge of the horizontal synchronous signal SH, exhibits positive RD (+) when being converted into ten-bit word data, the aforementioned four eight-bit word data positioned from the leading edge of the timing signal STM to the leading edge of the horizontal synchronous signal SH is substituted with the first additional word data group. In contrast, if the above-described eight-bit word data immediately before the leading edge of the timing signal STM exhibits negative RD (−) when being converted into ten-bit word data, the aforementioned four eight-bit word data is substituted with the second additional word data group.

Subsequently, according to the timing signal STM, 8B–10B conversion is performed on the multiplexed eight-bit word string data DX(8) provided with the first additional word data group or the second additional word data group, thereby forming the composite ten-bit word string data DZ(10). In this case, the synchronous word data DEK(8) is converted into K28.5, while the auxiliary word data DEA (8), DEB(8), and DEC(8) are converted into D21.3, D21.4, and D21.5, respectively.

The eight-bit word data (A0 through A7), (B0 through B7), etc., each having the leading edge corresponding to the leading edge of the horizontal synchronous signal SH, are converted into ten-bit word data (A'0 through A'9), (B'0 through B'9), etc. Then, eight-bit word data (A8 through A15), (A16 through A23), and so on, after the eight-bit word data (A0 through A7) are converted into ten-bit word data (A'10 through A'19), (A'20 through A'29), and so on, after the ten-bit word data (A'0 through A'9). Similarly, eight-bit word data (B8 through B15), (B16 through B23), and so on, after the eight-bit word data (B0 through B7) are converted into ten-bit word data (B'10 through B'19), (B'20 through B'29), and so on, after the ten-bit word data (B'0 through B'9).

In the composite ten-bit word string data DZ(10) obtained as described above, as represented by D and E of FIG. 2, the four ten-bit word data after the leading edge of the timing signal STM are used as four inserted word data based on the first additional word data group or the second additional word data group. If the RD of the ten-bit word data immediately before the leading edge of the timing signal STM is positive (+), the four inserted word data is based on the first additional word data group. In this case, the four inserted word data sequentially consists of −D21.4 converted from the auxiliary word data DEB(8), D21.3 converted from the auxiliary word data DEA(8), +K28.5 converted from the synchronous word data DEK(8), and D21.5 converted from the auxiliary word data DEC(8). Conversely, if the RD of the ten-bit word data immediately before the leading edge of the timing signal STM is negative (−), the four inserted word data is based on the second additional word data group. In this case, the four inserted word data sequentially consists of D21.5 converted from the auxiliary word data DEC(8), D21.3 converted from the auxiliary word data DEA(8), +K28.5 converted from the synchronous word data DEK(8), and D21.5 converted from the auxiliary word data DEC(8).

Hence, according to the composite ten-bit word string data DZ(10) formed by the ten-bit word string data forming unit 14, the ten-bit synchronous word data having a positive RD, i.e., +K28.5, reliably exists at the position shifted backward by two word data from each of the ten-bit word data (A'0 through A'9), (B'0 through B'9), and so on, converted from the eight-bit word data (A0 through A7), (B0 through B0 through B7), and so on, respectively, having the leading edge corresponding to the leading edge of the horizontal synchronous signal SH. That is, the ten-bit word string data forming unit 14 selects the first additional word data group or the second additional word data group to be inserted between words of the multiplexed eight-bit word string data DX(8) so as to satisfy the above-described requirement. That is, the composite ten-bit word string data DZ(10) always contains +K28.5 in the inserted four word data.

The resulting composite ten-bit word string data DZ(10) containing +K28.5 is supplied to a parallel-to-serial (P/S) converter 18, which forms a data transmitting unit. The composite ten-bit word string data DZ(10) is then converted into serial data DZS in the P/S converter 18. Subsequently, the serial data DZS is transmitted from the P/S converter 18 via, for example, an optical transmitter. The optical transmitter converts the serial data DZS into a light signal, and transmits it to a data transmission channel, which is formed of an optical fiber.

In the foregoing embodiment, in the ten-bit word string forming unit 14, the first additional word data group or the second additional word data group provided with four eight-bit word data containing the synchronous word data is inserted between words of the multiplexed eight-bit word string data DX(8) according to the timing signal STM. In the present invention, however, the number of eight-bit word data to be inserted into words of the multiplexed eight-bit word string data DX(8) is not limited to four, and may be two or three.

It is now assumed that in the ten-bit word string data forming unit 14, the first additional word data group or the second additional word data group provided with three eight-bit word data containing the synchronous word data is inserted. In this case, the word data transmitter 16 may transmit the auxiliary word data DEB(8), the synchronous word data DEK(8), and the auxiliary word data DEC(8), while the word data transmitter 17 may transmit the auxiliary word data DEC(8), the synchronous word data DEK(8), and the auxiliary word data DEC(8). Then, the leading edge of the multiplexed eight-bit word string data DX(8) which is shifted by three word data from each of the eight-bit word data (A0 through A7), (B0 through B7), etc. having the leading edge corresponding to the leading edge of the horizontal synchronous signal SH, may be specified according to the timing signal STM. Subsequently, three eight-bit word data positioned from the leading edge of the timing signal STM to the leading edge of the horizontal synchronous signal SH may be substituted with the first additional word data group sent from the word data transmitter 16 or the second additional word data group sent from the word data transmitter 17.

In this case, if the eight-bit word data immediately before the leading edge of the timing signal STM, i.e., the eight-bit word data shifted by four word data from each of the eight-bit word data (A0 through A7), (B0 through B7), etc. having the leading edge corresponding to the leading edge of the horizontal synchronous signal SH, exhibits positive (+) RD when being converted into ten-bit word data, three eight-bit word data positioned from the leading edge of the timing signal STM to the leading edge of the horizontal synchronous signal SH may be replaced with the first additional word data group. On the other hand, if the above-described eight-bit word data immediately before the leading edge of the timing signal STM exhibits negative (−) RD when being converted into ten-bit word data, the aforementioned three eight-bit word data may be replaced with the second additional word data group.

It is now assumed that in the ten-bit word string data forming unit 14, the first additional word data group or the second additional word data group provided with two eight-bit word data containing the synchronous word data is inserted between words of the multiplexed eight-bit word string data DX(8). In this case, the word data transmitter 16 may transmit the auxiliary word data DEB(8) and the synchronous word data DEK(8), while the word data transmitter 17 may transmit the auxiliary word data DEC(8) and the synchronous word data DEK(8). Then, the leading edge of the multiplexed eight-bit word string data DX(8) which is shifted by two word data from each of the eight-bit word data (A0 through A7), (B0 through B7), etc. having the leading edge corresponding to the leading edge of the horizontal synchronous signal SH, may be specified according to the timing signal STM. Subsequently, two eight-bit word data positioned from the leading edge of the timing signal STM to the leading edge of the horizontal synchronous signal SH may be substituted with the first additional word data group sent from the word data transmitter 16 or the second additional word data group sent from the word data transmitter 17.

In this case, if the eight-bit word data immediately before the leading edge of the timing signal STM, i.e., the eight-bit word data shifted by three word data from each of the eight-bit word data (A0 through A7), (B0 through B7), etc. having the leading edge corresponding to the leading edge of the horizontal synchronous signal SH, exhibits positive (+) RD when being converted into ten-bit word data, two eight-bit word data positioned from the leading edge of the timing signal STM to the leading edge of the horizontal synchronous signal SH may be replaced with the first additional word data group. On the other hand, if the above-described eight-bit word data immediately before the leading edge of the timing signal STM exhibits negative (−) RD when being converted into ten-bit word data, the aforementioned two eight-bit word data may be replaced with the second additional word data group.

In the foregoing embodiment, the composite ten-bit word string data DZ(10), formed in the ten-bit word string data forming unit 14, always contains a positive RD, i.e., +K28.5, in the first or second additional word data group. In the present invention, however, the composite ten-bit word string data DZ(10) may always contain a negative RD, i.e., −K28.5, in the first or second additional word data group.

In this modification, as well as in the foregoing embodiment, the number of eight-bit word data including the synchronous word data to be inserted between words of the multiplexed eight-bit word string data DX(8) by the ten-bit word string data forming unit 14 may also be four, three, or two.

It is now assumed that the composite ten-bit word string data DZ(10) always contains negative (−) RD, i.e., −K28.5, in the first or second additional word data group.

It is also assumed that four eight-bit word data including the synchronous word data are inserted as the first or second additional word data group between words of the eight-bit word string data DX(8). In this case, the word data transmitter 16 may send the auxiliary word data DEB(8), the auxiliary word data DEA(8), the synchronous word data DEK(8), and the auxiliary word data DEC(8), while the word data transmitter 17 may send the auxiliary word data DEC(8), the auxiliary word data DEA(8), the synchronous word data DEK(8), and the auxiliary word data DEC(8). Then, the leading edge of the multiplexed eight-bit word string data DX(8) which is shifted by four word data from each of the eight-bit word data (A0 through A7), (B0 through B7), and so on, having the leading edge corresponding to the leading edge of the horizontal synchronous signal SH, may be designated according to the leading edge of the timing signal STM. Thereafter, four eight-bit word data positioned from the leading edge of the timing signal STM to the leading edge of the horizontal synchronous signal SH may be substituted with the first additional word data group transmitted from the word data transmitter 16 or the second additional word data group transmitted from the word data transmitter 17.

In this case, if the eight-bit word data immediately before the leading edge of the timing signal STM, i.e., the eight-bit word data shifted by five word data from each of the eight-bit word data (A0 through A7), (B0 through B7), etc. having the leading edge corresponding to the leading edge of the horizontal synchronous signal SH, exhibits negative (−) RD when being converted into ten-bit word data, the four eight-bit word data positioned from the leading edge of the timing signal STM to the leading edge of the horizontal synchronous signal SH may be substituted with the first additional word data group. Conversely, if the above-described eight-bit word data immediately before the leading edge of the timing signal STM exhibits positive (+) RD when being converted into ten-bit word data, the aforementioned four eight-bit word data may be substituted with the second additional word data group.

It is now assumed that the composite ten-bit word string data DZ(10) always contains negative (−) RD, i.e., −K28.5, in the first or second additional word data group. It is also assumed that three eight-bit word data including the synchronous word data are inserted between words of the multiplexed eight-bit word string data DX(8) according to the timing signal STM. In this case, the word data transmitter 16 may send the auxiliary word data DEB(8), the synchronous word data DEK(8), and the auxiliary word data DEC(8), while the word data transmitter 17 may send the auxiliary word data DEC(8), the synchronous word data DEK(8), and the auxiliary word data DEC(8). Then, the leading edge of the multiplexed eight-bit word string data DX(8) which is shifted by three word data from each of the eight-bit word data (A0 through A7), (B0 through B7), etc. having the leading edge corresponding to the leading edge of the horizontal synchronous signal SH, may be specified according to the leading edge of the timing signal STM. Thereafter, the three eight-bit word data positioned from the leading edge of the timing signal STM to the leading edge of the horizontal synchronous signal SH may be substituted with the first additional word data group transmitted from the word data transmitter 16 or the second additional word data group transmitted from the word data transmitter 17.

In this case, if the eight-bit word data immediately before the leading edge of the timing signal STM, i.e., the eight-bit word data shifted by four word data from each of the eight-bit word data (A0 through A7), (B0 through B7), etc. having the leading edge corresponding to the leading edge of the horizontal synchronous signal SH, exhibits negative (−) RD when being converted into ten-bit word data, the three eight-bit word data positioned from the leading edge of the timing signal STM to the leading edge of the horizontal synchronous signal SH may be substituted with the first additional word data group. Conversely, if the above-described eight-bit word data immediately before the leading edge of the timing signal STM exhibits positive (+) RD when being converted into ten-bit word data, the aforementioned three eight-bit word data may be substituted with the second additional word data group.

It is now assumed that the composite ten-bit word string data DZ(10) always contains negative (−) RD, i.e., −K28.5, in the first or second additional word data group. It is also assumed that two eight-bit word data including the synchronous word data are inserted between words of the multiplexed eight-bit word string data DX(8) according to the timing signal STM. In this case, the word data transmitter 16 may send the auxiliary word data DEB(8) and the synchronous word data DEK(8), while the word data transmitter 17 may send the auxiliary word data DEC(8) and the synchronous word data DEK(8). Then, the leading edge of the multiplexed eight-bit word string data DX(8) which is shifted by two word data from each of the eight-bit word data (A0 through A7), (B0 through B7), and so on, having the leading edge corresponding to the leading edge of the horizontal synchronous signal SH, may be specified according to the leading edge of the timing signal STM. Subsequently, the two eight-bit word data positioned from the leading edge of the timing signal STM to the leading edge of the horizontal synchronous signal SH may be substituted with the first additional word data group transmitted from the word data transmitter 16 or the second additional word data group transmitted from the word data transmitter 17.

In this case, if the eight-bit word data immediately before the leading edge of the timing signal STM, i.e., the eight-bit word data shifted by three word data from each of the eight-bit word data (A0 through A7), (B0 through B7), etc. having the leading edge corresponding to the leading edge of the horizontal synchronous signal SH, exhibits negative (−) RD when being converted into ten-bit word data, the two eight-bit word data positioned from the leading edge of the timing signal STM to the leading edge of the horizontal synchronous signal SH may be replaced with the first additional word data group. In contrast, if the above-described eight-bit word data immediately before the leading edge of the timing signal STM exhibits positive (+) RD when being converted into ten-bit word data, the aforementioned two eight-bit word data may be replaced with the second additional word data group.

Figure 4:
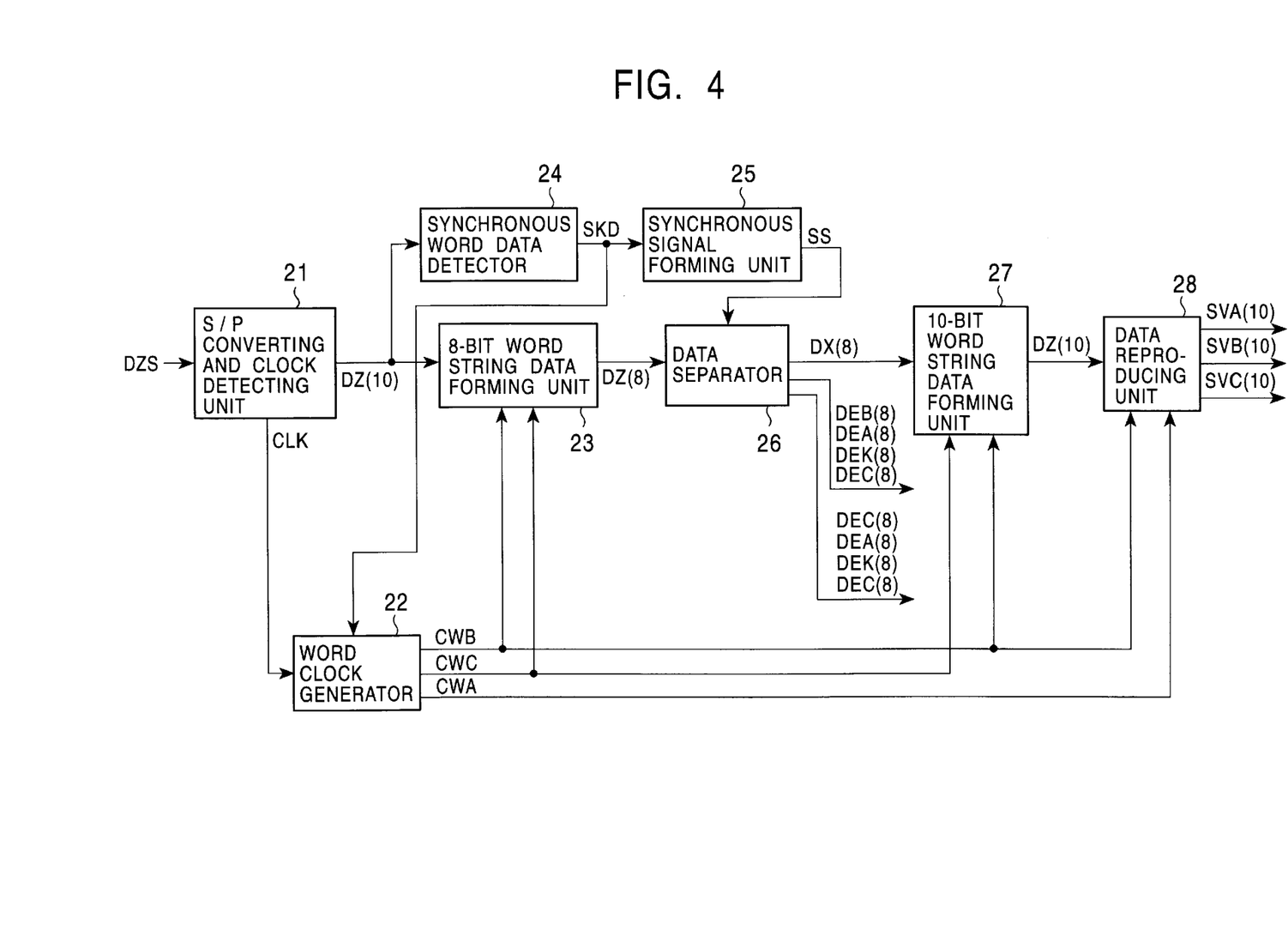
FIG. 4 is a block diagram illustrating a data receiving apparatus for receiving data transmitted from the data transmission apparatus shown in FIG. 1.

FIG. 4 is a block diagram illustrating a data receiving apparatus for receiving the serial data DZS based on the composite ten-bit word string data DZ(10) transmitted from the P/S converter 18 shown in FIG. 1.

Figure 5:
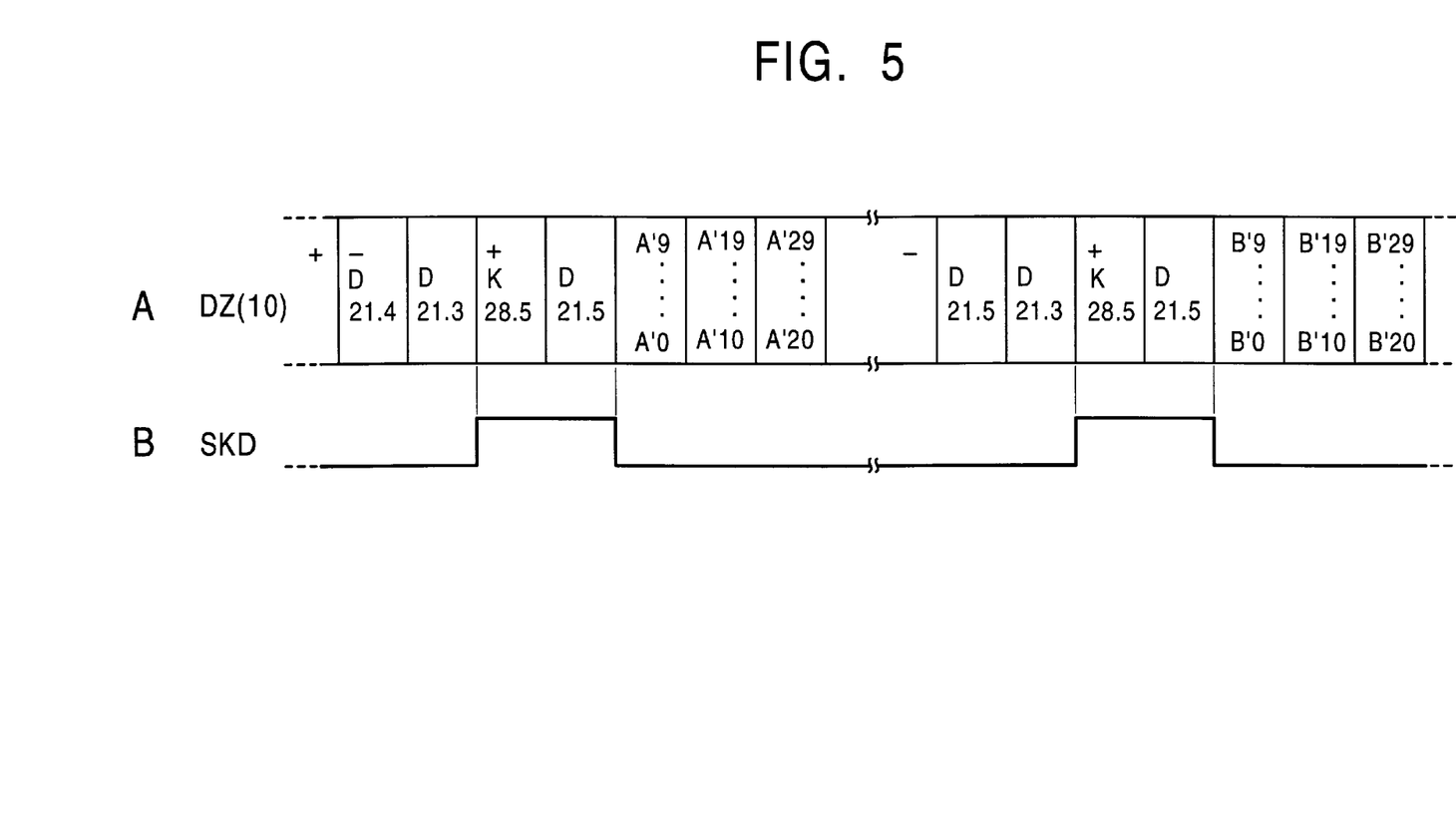
FIG. 5 is a timing chart illustrating an operation performed by the data receiving apparatus shown in FIG. 4.

In this data receiving apparatus, the serial data DZS based on the composite ten-bit word string data DZ(10) transmitted through a data transmission channel, formed of, for example, an optical fiber, is supplied. In a serial-to-parallel (S/P) converting and clock detecting unit 21, S/P conversion is performed on the serial data DZS, thereby forming parallel composite ten-bit word string data DZ(10), as represented by A of FIG. 5.

In the S/P converting and clock detecting unit 21, the clock is detected from the serial data DZS so as to reproduce a clock signal CLK. The reproduced clock signal CLK is supplied to a word clock generator 22, and three types of word clock signals CWB, CWC, and CWA based on the clock signal CLK are output from the word clock generator 22.

The composite ten-bit word string data DZ(10) obtained in the S/P converting and clock detecting unit 21 is supplied to an eight-bit word string data forming unit 23 and a synchronous word data detector 24. The synchronous word data detector 24 detects the ten-bit synchronous data having a positive RD, i.e., +K28.5, contained in the first or second additional word data group of the composite ten-bit word string data DZ(10), and then outputs a synchronous word data detection signal SKD, as indicated by B of FIG. 5.

The synchronous word data detection signal SKD obtained in the synchronous word data detector 24 is supplied to the word clock generator 22 and a synchronous signal forming unit 25. In the word clock generator 22, the phases of the word clock signals CWB, CWC, and CWA are determined by the synchronous word data detection signal SKD. In the synchronous signal forming unit 25, a synchronous signal SS is formed based on the synchronous word data detection signal SKD.

Supplied to the eight-bit word string data forming unit 23 are not only the composite ten-bit word string data DZ(10) from the S/P converting and clock detecting unit 21, but also the word clock signals CWB and CWC sent from the word clock generator 22. Then, in the eight-bit word string data forming unit 23, 10B–8B conversion is conducted on the composite ten-bit word string data DZ(10) based on the word clock signals CWB and CWC, thereby forming composite eight-bit word string data DZ(8) based on the composite ten-bit word string data DZ(10).

In this case, the ten-bit word data (A'0 through A'9), (A'10 through A'19), (A'20 through A'29), and so on, and (B'0 through B'9), (B'10 through B'19), (B'20 through B'29), and so on, are respectively converted into (A0 through A7), (A8 through A15), (A16 through A23), etc., and (B0 through B7), (B8 through B15), (B16 through B23), etc. Additionally, the ten-bit word data, i.e., –D21.4, D21.3, and D21.5, and the ten-bit synchronous word data, i.e., +K28.5, contained in the first additional word data group of the composite ten-bit word string data DZ(10) are converted into the auxiliary word data DEB(8), the auxiliary word data DEA(8), the auxiliary word data DEC(8), and the synchronous word data DEK(8), respectively. The ten-bit word data, i.e., D21.5, D21.3, and D21.5, and the ten-bit synchronous word data, i.e., +K28.5, contained in the second additional word data group of the composite ten-bit word string data DZ(10) are converted into the auxiliary word data DEC(8), the auxiliary word data DEA(8), the auxiliary word data DEC(8), and the synchronous word data DEK(8), respectively. All of the converted eight-bit word data are contained in the composite eight-bit word string data DZ(8).

The composite eight-bit word string data DZ(8) obtained from the eight-bit word string data forming unit 23 is supplied to a data separator 26. The synchronous signal SS generated based on the synchronous word data detection signal SKD in the synchronous signal forming unit 25 is also supplied to the data separator 26. The data separator 26 then separates the following data from the composite eight-bit word string data DZ(8) based on the synchronous signal SS corresponding to the ten-bit synchronous word data, i.e., +K28.5: the multiplexed eight-bit word string data DX(8), the auxiliary word data DEB(8), the auxiliary word data DEA(8), the synchronous word data DEK(8), and the auxiliary word data DEC(8), the four data forming the first additional word data group; and the auxiliary word data DEC(8), the auxiliary word data DEA(8), the synchronous word data DEK(8), and the auxiliary word data DEC(8), the four data forming the second additional word data group.

The multiplexed eight-bit word string data DX(8) separated by the data separator 26 is supplied to a ten-bit word string data forming unit 27. The word clock signals CWC and CWB generated by the word clock generator 22 are supplied to the ten-bit word string data forming unit 27. Thus, in the ten-bit word string data forming unit 27, 8B–10B conversion is performed on the multiplexed eight-bit word string data DX(8) based on the word clock signals CWC and CWB, thereby forming the multiplexed ten-bit word string data DZ(10) based on the multiplexed eight-bit word string data DX(8).

The multiplexed ten-bit word string data DZ(10) obtained from the ten-bit word string data forming unit 27 is supplied to a data reproducing unit 28. The word clock signals CWC and CWB generated by the word clock generator 22 are also supplied to the data reproducing unit 28. In the data reproducing unit 28, the multiplexed ten-bit word string data DZ(10) is separated into ten-bit word string data SVA(10), SVB(10), and SVC(10), representing three types of video signal information, based on the word clock signals CWC and CWB. The ten-bit word string data SVA(10), SVB(10), and SVC(10) are then individually output from the data reproducing unit 28.

In the data receiving apparatus shown in FIG. 4, the serial data DZS converted from the composite ten-bit word string data DZ(10) containing the ten-bit synchronous word data always having a positive RD, i.e., +K28.5, is received, thereby reproducing the ten-bit word string data SVA(10), SVB(10), and SVC(10). Thus, the word synchronous data detector 24 detects +K28.5. Alternatively, the serial data DZS converted from the composite ten-bit word string data DZ(10) containing the ten-bit synchronous word data always having a negative RD, i.e., –K28.5, may be received. In this case, a data receiving apparatus for receiving such serial data DZS may be constructed similarly to that shown in FIG. 4, except that the synchronous word data detector 24 detects the ten-bit synchronous word data having a negative RD, i.e., –K28.5.

What is claimed is:

1. A data transmission method comprising:
   a receiving step of receiving eight-bit word string data indicating signal information;
   an insertion step of inserting an additional word data group including specific synchronous word data and at least one item of auxiliary word data, each data having eight bits and a predetermined code, between words of the eight-bit word string data in accordance with a predetermined timing signal;
   a conversion step of converting the eight-bit word string data provided with the additional word data group into ten-bit word string data;
   a forming step of forming composite ten-bit word string data including the additional word data group containing ten-bit synchronous word data which is converted from the specific synchronous word data; and
   a transmission step of transmitting the composite ten-bit word string data,
   wherein in said insertion step, the additional word data group is selected so that a running disparity of the ten-bit synchronous word data contained in the additional word data group of the composite ten-bit synchronous word data is consistently one of positive and negative.

2. A data transmission method according to claim 1, wherein in said insertion step, the additional word data group is selected so that the running disparity of the ten-bit synchronous word data contained in the additional word data group of the composite ten-bit synchronous word data is consistently positive.

3. A data transmission method according to claim 2, wherein the additional word data group of the composite ten-bit word string data includes ten-bit word data having a negative running disparity, ten-bit word data having a neutral running disparity, and ten-bit synchronous word data, or includes the ten-bit word data having a negative running disparity and the ten-bit synchronous word data when the running disparity of ten-bit word data positioned immediately before the additional word data group is positive, and wherein the additional word data group of the composite ten-bit word string data includes ten-bit word data having a neutral running disparity, another ten-bit word data having a neutral running disparity, and the ten-bit synchronous word data, or includes the ten-bit word data having a neutral running disparity and the ten-bit synchronous word data when the running disparity of ten-bit word data positioned immediately before the additional word data group is negative.

4. A data transmission method according to claim 3, wherein the additional word data group of the composite ten-bit word string data includes another ten-bit word data after the ten-bit synchronous word data.

5. A data transmission method according to claim 1, wherein in said insertion step, the additional word data group is selected so that the running disparity of the ten-bit synchronous word data contained in the additional word data group of the composite ten-bit synchronous word data is consistently negative.

6. A data transmission method according to claim 5, wherein the additional word data group of the composite ten-bit word string data includes ten-bit word data having a positive running disparity, ten-bit word data having a neutral running disparity, and ten-bit synchronous word data, or includes the ten-bit word data having a positive running disparity and the ten-bit synchronous word data when the running disparity of ten-bit word data positioned immediately before the additional word data group is negative, and wherein the additional word data group of the composite ten-bit word string data includes ten-bit word data having a neutral running disparity, another ten-bit word data having a neutral running disparity, and the ten-bit synchronous word data, or includes the ten-bit word data having a neutral running disparity and the ten-bit synchronous word data when the running disparity of ten-bit word data positioned immediately before the additional word data group is positive.

7. A data transmission method according to claim 6, wherein the additional word data group of the composite ten-bit word string data includes another ten-bit word data after the ten-bit synchronous word data.

8. A data transmission method according to claim 1, wherein the composite ten-bit word string data is converted into serial data, and the serial data is transmitted.

9. A data transmission method according to claim 8, wherein the serial data is transmitted through a data transmission channel formed of an optical fiber.

10. A data transmission method according to claim 1, wherein the eight-bit word string data represents video signal information, and the timing signal used for inserting the additional word data group between the words of the eight-bit word string data is synchronized with each horizontal period of the video signal information.

11. A data transmission apparatus comprising:
    a digital data forming unit for forming eight-bit word string data indicating signal information;
    a ten-bit word string data forming unit for inserting an additional word data group including specific synchronous word data and at least one item of auxiliary word data, each data having eight bits and a predetermined code, between words of the eight-bit word string data in accordance with a predetermined timing signal, and for converting the eight-bit word string data provided with the additional word data group into ten-bit word string data, thereby forming composite ten-bit word string data including the additional word data group containing ten-bit synchronous word data which is converted from the specific synchronous word data; and
    a data transmitting unit for transmitting the composite ten-bit word string data,
    wherein said ten-bit word string data forming unit inserts the additional word data group between the words of the eight-bit word string data so that a running disparity of the ten-bit synchronous word data contained in the additional word data group of the composite ten-bit synchronous word data is consistently one of positive and negative.

12. A data transmission apparatus according to claim 11, wherein said ten-bit word string data forming unit inserts the additional word data group between the words of the eight-bit word string data so that the running disparity of the ten-bit synchronous word data contained in the additional word data group of the composite ten-bit synchronous word data is consistently positive.

13. A data transmission apparatus according to claim 12, wherein said ten-bit word string data forming unit comprises a word data transmitter for supplying the additional word data group.

14. A data transmission apparatus according to claim 13, wherein said word data transmitter supplies the additional word data group to said ten-bit word string data forming unit so that the additional word data group of the composite ten-bit word string data includes ten-bit word data having a negative running disparity, ten-bit word data having a neutral running disparity, and ten-bit synchronous word data, or includes the ten-bit word data having a negative running disparity and the ten-bit synchronous word data when the running disparity of ten-bit word data positioned immediately before the additional word data group is positive, and wherein said word data transmitter supplies the additional word data group to said ten-bit word string data forming unit so that the additional word data group of the composite ten-bit word string data includes ten-bit word data having a neutral running disparity, another ten-bit word data having a neutral running disparity, and the ten-bit synchronous word data, or includes the ten-bit word data having a neutral running disparity and the ten-bit synchronous word data when the running disparity of ten-bit word data positioned immediately before the additional word data group is negative.

15. A data transmission apparatus according to claim 14, wherein said word data transmitter supplies the additional word data group to said ten-bit word string data forming unit so that the additional word data group further includes another ten-bit word data after the ten-bit synchronous word data.

16. A data transmission apparatus according to claim 11, wherein said ten-bit word string data forming unit inserts the additional word data group between the words of the eight-bit word string data so that the running disparity of the ten-bit synchronous word data contained in the additional word data group of the composite ten-bit synchronous word data is consistently negative.

17. A data transmission apparatus according to claim 16, wherein said ten-bit word string data forming unit comprises a word data transmitter for supplying the additional word data group.

18. A data transmission apparatus according to claim 17, wherein said word data transmitter supplies the additional word data group to said ten-bit word string data forming unit so that the additional word data group of the composite ten-bit word string data includes ten-bit word data having a positive running disparity, ten-bit word data having a neutral running disparity, and ten-bit synchronous word data, or includes the ten-bit word data having a positive running disparity and the ten-bit synchronous word data when the running disparity of ten-bit word data positioned immediately before the additional word data group is negative, and wherein said word data transmitter supplies the additional word data group to said ten-bit word string data forming unit so that the additional word data group of the composite ten-bit word string data includes ten-bit word data having a neutral running disparity, another ten-bit word data having a neutral running disparity, and the ten-bit synchronous word data, or includes the ten-bit word data having a neutral running disparity and the ten-bit synchronous word data when the running disparity of ten-bit word data positioned immediately before the additional word data group is positive.

19. A data transmission apparatus according to claim 18, wherein said word data transmitter supplies the additional word data group to said ten-bit word string data forming unit so that the additional word data group further includes another ten-bit word data after the ten-bit synchronous word data.

20. A data transmission apparatus according to claim 11, wherein said data transmitting unit converts the composite ten-bit word string data into serial data, and transmits the serial data.

21. A data transmission apparatus according to claim 20, wherein said data transmitting unit transmits the serial data to a data transmission channel which is formed of an optical fiber.

22. A data transmission apparatus according to claim 11, wherein the eight-bit word string data obtained from said digital data forming unit represents video signal information, and the timing signal used for inserting the additional word data group between the words of the eight-bit word string data by said ten-bit word string data forming unit is synchronized with each horizontal period of the video signal information.

* * * * *